(12) United States Patent
Petterson et al.

(10) Patent No.: US 12,687,143 B2
(45) Date of Patent: Jul. 21, 2026

(54) SYSTEM AND METHOD OF ADDING GASEOUS OXYGEN ADDITIVE DERIVED FROM AN OXYGEN CONCENTRATOR TO DIESEL FUEL TO IMPROVE COMBUSTION

(71) Applicant: H2DIESEL, INC., Lewes, DE (US)

(72) Inventors: John S. Petterson, La Jolla, CA (US); John L. Haller, La Jolla, CA (US)

(73) Assignee: H2DIESEL, INC., Lewes, DE (US)

( * ) Notice: Subject to any disclaimer, the term of this patent is extended or adjusted under 35 U.S.C. 154(b) by 0 days.

(21) Appl. No.: 18/694,773

(22) PCT Filed: Nov. 27, 2023

(86) PCT No.: PCT/US2023/081152
§ 371 (c)(1),
(2) Date: Mar. 22, 2024

(87) PCT Pub. No.: WO2024/129346
PCT Pub. Date: Jun. 20, 2024

(65) Prior Publication Data
US 2026/0160223 A1     Jun. 11, 2026

Related U.S. Application Data

(60) Provisional application No. 63/432,554, filed on Dec. 14, 2022.

(51) Int. Cl.
*F02M 27/00*     (2006.01)
*B01D 53/047*     (2006.01)
(Continued)

(52) U.S. Cl.
CPC ........... *F02M 27/00* (2013.01); *B01D 53/047* (2013.01); *B01D 53/22* (2013.01); *F02B 43/10* (2013.01);
(Continued)

(58) Field of Classification Search
CPC ...... F02M 27/00; B01D 53/047; B01D 53/22; B01D 2253/108; B01D 2256/12;
(Continued)

(56) References Cited

U.S. PATENT DOCUMENTS

| | | | |
|---|---|---|---|
| 4,259,021 A | 3/1981 | Goudy, Jr. | |
| 4,334,889 A | 6/1982 | Takabayashi | |

(Continued)

FOREIGN PATENT DOCUMENTS

| | | | | |
|---|---|---|---|---|
| CN | 110240953 A | 9/2019 | | |
| CN | 107701159 B | * 12/2020 | ........... | E21B 43/243 |

(Continued)

OTHER PUBLICATIONS

United States International Searching Authority, International Search Report and Written Opinion for corresponding International Application No. PCT/US2024/017795, mailed Aug. 7, 2024, 15 pages.

(Continued)

*Primary Examiner* — Joseph J Dallo
(74) *Attorney, Agent, or Firm* — David R. Heckadon; Gordon Rees Scully Mansukhani LLP

(57) ABSTRACT

A system of enhancing fuel combustion in an engine which may be a diesel engine or a hydro-diesel engine, by: (a) providing a supply of liquid diesel fuel; (b) using an oxygen concentrator to produce a concentrated oxygen gas; (c) mixing the concentrated oxygen gas into the liquid diesel fuel; and then (d) passing the homogeneous mixture of liquid diesel fuel and concentrated oxygen gas into a combustion chamber of an engine; and optionally (e) providing a supply of hydrogen gas; and (f) mixing the hydrogen gas into the liquid diesel fuel as well.

23 Claims, 2 Drawing Sheets

(51) Int. Cl.
    *B01D 53/22*       (2006.01)
    *F02B 43/10*       (2006.01)
    *F02D 19/06*       (2006.01)

(52) U.S. Cl.
    CPC ..... *F02D 19/0644* (2013.01); *F02D 19/0649* (2013.01); *F02D 19/0673* (2013.01); *F02D 19/0684* (2013.01); *B01D 2253/108* (2013.01); *B01D 2256/12* (2013.01); *B01D 2257/102* (2013.01); *B01D 2258/06* (2013.01); *F02B 2043/106* (2013.01)

(58) Field of Classification Search
    CPC .......... B01D 2257/102; B01D 2258/06; F02B 43/10; F02B 2043/106; F02D 19/0644; F02D 19/0649; F02D 19/0673; F02D 19/0684
    See application file for complete search history.

(56) References Cited

U.S. PATENT DOCUMENTS

| | | | |
|---|---|---|---|
| 4,388,893 A | 6/1983 | Apfel | |
| 4,742,810 A | 5/1988 | Anders et al. | |
| 6,164,813 A | 12/2000 | Wang | |
| 6,205,981 B1 | 3/2001 | Lorraine | |
| 6,207,064 B1 | 3/2001 | Gargas | |
| 6,478,857 B2 | 11/2002 | Czabala | |
| 6,606,855 B1 | 8/2003 | Kong et al. | |
| 6,641,625 B1 | 11/2003 | Clawson et al. | |
| 6,804,950 B2 | 10/2004 | Kong et al. | |
| 6,988,033 B1 | 1/2006 | Lowrey et al. | |
| 7,377,272 B2 | 5/2008 | Davidson | |
| 7,430,991 B2 | 10/2008 | VanHoose et al. | |
| 7,621,260 B2 | 11/2009 | Mitani et al. | |
| 7,715,961 B1 | 5/2010 | Kargupta | |
| 7,789,047 B2 | 9/2010 | Kuroki et al. | |
| 7,841,762 B2 | 11/2010 | Oogawara et al. | |
| 7,861,696 B2 | 1/2011 | Lund | |
| 7,882,789 B2 | 2/2011 | Kumar et al. | |
| 7,946,258 B2 | 5/2011 | Adams | |
| 8,176,884 B2 * | 5/2012 | Tewari ................... | F02M 25/12 |
| | | | 123/585 |
| 8,333,171 B2 | 12/2012 | Lund | |
| 8,377,180 B2 | 2/2013 | Maeda et al. | |
| 8,478,514 B2 | 7/2013 | Kargupta | |
| 8,544,452 B1 | 10/2013 | Galvin et al. | |
| RE45,413 E | 3/2015 | Lund | |
| 9,388,749 B2 | 7/2016 | MacDonald | |
| 9,527,046 B1 | 12/2016 | Roe | |
| 9,586,186 B2 | 3/2017 | Roe | |
| 9,638,136 B2 | 5/2017 | Jung | |
| 9,884,162 B2 | 2/2018 | Kobayashi et al. | |
| 9,945,299 B2 | 4/2018 | Lund | |
| 10,080,998 B2 | 9/2018 | Roe et al. | |
| 10,280,877 B2 | 5/2019 | Hamad et al. | |
| 10,486,114 B2 | 11/2019 | Roe | |
| 10,494,992 B2 | 12/2019 | Johnson et al. | |
| 10,527,013 B2 | 1/2020 | St. Mary et al. | |
| 10,605,162 B2 | 3/2020 | Johnson et al. | |
| 10,738,746 B1 * | 8/2020 | Teller ................... | F02M 61/042 |
| 10,746,094 B2 | 8/2020 | Johnson et al. | |
| 10,815,123 B2 | 10/2020 | Northrop | |
| 10,920,717 B1 | 2/2021 | Owens | |
| 11,239,479 B2 | 2/2022 | Katikaneni et al. | |
| 11,247,014 B2 | 2/2022 | Koizumi et al. | |
| 11,598,276 B1 | 3/2023 | Klingbeil et al. | |
| 12,134,990 B2 | 11/2024 | Walker et al. | |
| 2002/0127445 A1 | 9/2002 | Carpenter et al. | |
| 2004/0101795 A1 | 5/2004 | Fairfull | |
| 2006/0288869 A1 | 12/2006 | Warren et al. | |
| 2007/0020568 A1 | 1/2007 | Finley | |
| 2007/0033929 A1 | 2/2007 | Telford et al. | |
| 2008/0223332 A1 | 9/2008 | Maro et al. | |
| 2008/0223344 A1 | 9/2008 | Suzuki et al. | |
| 2008/0245318 A1 | 10/2008 | Kuroki et al. | |
| 2009/0012698 A1 | 1/2009 | Shinagawa et al. | |
| 2009/0283059 A1 * | 11/2009 | Tewari ................... | F02M 25/12 |
| | | | 123/3 |
| 2010/0228415 A1 | 9/2010 | Paul | |
| 2010/0294994 A1 | 11/2010 | Basini et al. | |
| 2011/0023853 A1 | 2/2011 | Lund | |
| 2011/0061622 A1 | 3/2011 | Lund | |
| 2012/0037098 A1 | 2/2012 | Wey | |
| 2012/0186560 A1 | 7/2012 | Lund | |
| 2013/0175201 A1 | 7/2013 | Caliga et al. | |
| 2013/0269243 A1 | 10/2013 | Lund | |
| 2014/0182301 A1 * | 7/2014 | Fadde ...................... | F23C 9/00 |
| | | | 60/726 |
| 2014/0338638 A1 * | 11/2014 | Rothe ................... | F02M 25/10 |
| | | | 60/299 |
| 2015/0081199 A1 | 3/2015 | Chauncey et al. | |
| 2015/0114351 A1 | 4/2015 | Lund | |
| 2015/0136047 A1 | 5/2015 | Hou | |
| 2015/0226113 A1 | 8/2015 | Alexander et al. | |
| 2016/0362114 A1 | 12/2016 | Chauncey et al. | |
| 2018/0015429 A1 * | 1/2018 | Roe ....................... | C02F 3/1278 |
| 2018/0119036 A1 * | 5/2018 | Mani ...................... | C10G 3/50 |
| 2018/0156173 A1 * | 6/2018 | Huwyler ................ | F02M 43/02 |
| 2018/0163600 A1 * | 6/2018 | Kane ..................... | F02B 37/001 |
| 2019/0085802 A1 | 3/2019 | St. Mary et al. | |
| 2019/0136791 A1 * | 5/2019 | Kurtz ...................... | F02N 11/08 |
| 2019/0145327 A1 | 5/2019 | Gieger et al. | |
| 2020/0061549 A1 | 2/2020 | Roe | |
| 2021/0101110 A1 | 4/2021 | Rheaume et al. | |
| 2021/0131361 A1 | 5/2021 | Turner et al. | |
| 2022/0325684 A1 | 10/2022 | Lawhorn | |
| 2023/0268538 A1 | 8/2023 | Wiekamp | |
| 2023/0340919 A1 | 10/2023 | Mercal et al. | |
| 2023/0417198 A1 | 12/2023 | Lund | |

FOREIGN PATENT DOCUMENTS

| | | | | |
|---|---|---|---|---|
| DE | 102013003982 A1 | 9/2014 | | |
| DE | 102029213283 A1 | 3/2021 | | |
| EP | 1883750 B1 | 2/2008 | | |
| WO | 2006126341 A2 | 11/2006 | | |
| WO | 2007062217 A2 | 5/2007 | | |
| WO | 2008125976 A2 | 10/2008 | | |
| WO | WO-2013054188 A2 * | 4/2013 | ............. | F02P 13/00 |
| WO | 2014039663 A2 | 3/2014 | | |
| WO | 2017004551 A1 | 1/2017 | | |
| WO | 2017205681 A1 | 11/2017 | | |
| WO | 2022096718 A1 | 5/2022 | | |
| WO | 2023154174 A1 | 8/2023 | | |

OTHER PUBLICATIONS

United States International Searching Authority, International Search Report and Written Opinion for corresponding International Application No. PCT/US2023/081154, mailed Mar. 28, 2024, 12 pages.

NissanConnect Services Remote Engine Start/Stop, Nissan, 2022, 4 pages, https://web.archive.org/web/20221203160155/https://www.nissanusa.com/connect/features-apps/remote-engine-start.html.

United States International Searching Authority, Invitation to Pay Additional Fees for International Application No. PCT/US2024/017795, mailed May 30, 2024, 2 pages.

United States International Searching Authority, International Search Report and Written Opinion for corresponding International Application No. PCT/US2023/081152, mailed Apr. 29, 2024, 13 pages.

United States International Searching Authority, International Search Report and Written Opinion for corresponding International Application No. PCT/US2023/035695, mailed Feb. 7, 2024, 12 pages.

United States International Searching Authority, International Search Report and Written Opinion for corresponding International Application No. PCT/US2023/037208, mailed Feb. 22, 2024, 10 pages.

Green Car Congress, Hydrogen-Enhanced Combustion Engine Could Improve Gasoline Fuel Economy by 20% to 30%, Nov. 5, 2005, https://www.greencarcongress.com/2005/11/hydrogenenhance.html, 2 pages.

(56) References Cited

OTHER PUBLICATIONS

Lee et al., Plasma Assisted Hydrogen Generation: A Mechanistic Review, Fuel Processing Technology 247 (2023) 107761, 16 pages.

* cited by examiner

SYSTEM AND METHOD OF ADDING GASEOUS OXYGEN ADDITIVE DERIVED FROM AN OXYGEN CONCENTRATOR TO DIESEL FUEL TO IMPROVE COMBUSTION

RELATED APPLICATION

The present application claims priority to U.S. Provisional Patent Application Ser. No. 63/432,554, of same title, filed Dec. 14, 2022, the entire disclosure of which is incorporated herein by reference in its entirety for all purposes.

TECHNICAL FIELD

The present invention is related to systems for increasing combustion efficiencies in both diesel engines and hydro-diesel engines.

BACKGROUND OF THE INVENTION

A conventional diesel engine system moves diesel fuel from a fuel tank into an injector pump. The injector pump then moves the fuel into a common rail under very high pressures, and the fuel is then injected into separate combustion chambers by individual fuel injectors. Traditional diesel engines may also include additional components between the fuel tank and the common rail such as a lift pump and/or fuel filters or other devices to facilitate the movement of the fuel into the common rail. Ambient air enters the combustion chamber of the engine through an engine air intake valve when the piston within the combustion chamber recedes. Exhaust gases are then moved out of the combustion chamber through an exhaust port as the piston later advances. The diesel fuel is injected into the combustion chamber of the engine as the piston moves to its top dead center position. At the moment of the fuel injection into the combustion chamber, the pressure within the combustion chamber is at a much lower pressure than the injection pressure. As the fuel explosively burns within the combustion chamber it forces the piston down.

Diesel fuel engines have been around for many years. Recently, hydro-diesel engines have been developed as well. Hydro-diesel engines add hydrogen gas into the diesel fuel upstream of the engine. Although the efficiencies of both standard diesel engines and hydro-diesel engines can be quite good, improvements are always desired to further increase the efficiency of the combustion process. Ideally, such improvements would enhance engine combustion efficiency in a manner that also decreases pollution or the production of unwanted gasses from the engine. As will be shown, the present system addresses these concerns by both increasing engine efficiency and decreasing pollution from the engine.

SUMMARY OF THE INVENTION

The present invention improves the efficiencies of both standard diesel engines and hydro-diesel engines by adding concentrated oxygen gas into the diesel fuel prior to the diesel fuel reaching the engine. The present system is ideally suited for use in a vehicle engine (for example, the engine of an automobile, bus, locomotive or other transportation system). The concentrated oxygen gas is preferably generated by a novel onboard oxygen concentrator. In the case of a standard diesel engine, the concentrated oxygen gas is mixed together with the liquid diesel fuel. In the case of a hydro-diesel engine, hydrogen gas is also mixed together with the mixture of concentrated oxygen gas and liquid diesel fuel.

In preferred aspects, (for example when the engine is a standard diesel engine), the present system provides a method of enhancing fuel combustion in an engine, by:

(a) providing a supply of liquid diesel fuel;

(b) providing an oxygen concentrator, wherein the oxygen concentrator receives ambient air therein and removes nitrogen from the air to produce a concentrated oxygen gas;

(c) mixing the concentrated oxygen gas into the liquid diesel fuel to form a homogeneous mixture of liquid diesel fuel and concentrated oxygen gas (for example, by bubbling the concentrated oxygen gas into the liquid diesel fuel in an infuser or mixer); and then (d) passing the homogeneous mixture of liquid diesel fuel and concentrated oxygen gas into a combustion chamber of the engine.

In additional aspects, (for example when the engine is a hydro-diesel engine), the present method further comprises:

(e) providing a supply of hydrogen gas; and (f) mixing the hydrogen gas into the liquid diesel fuel (for example by bubbling the hydrogen gas into the liquid diesel fuel in an infuser or mixer) to form a homogeneous mixture of liquid diesel fuel, concentrated oxygen gas and hydrogen gas.

In these optional hydro-diesel aspects, the hydrogen gas can be provided through bottled hydrogen, electrolysis sourced hydrogen or reformed hydrogen.

In preferred aspects, the passing of the homogeneous mixture of liquid diesel fuel and concentrated oxygen gas into the combustion chamber of an engine comprises:

providing a lift pump and an injector;

using the lift pump to pump the homogeneous mixture of liquid diesel fuel and concentrated oxygen gas from the infuser or mixer into the injector; and then using the injector to inject the homogeneous mixture of liquid diesel fuel and concentrated oxygen gas into:

(i) the combustion chamber of the engine, or (ii) a common rail leading into the combustion chamber of the engine.

In either the case of a standard diesel engine or a hydro-diesel engine, ambient air enters the combustion chamber through an air inlet valve, port or via on the engine. This ambient air is compressed in the combustion chamber with a piston moving upwardly thereby increasing the temperature of the ambient air. The homogeneous mixture of liquid diesel fuel and concentrated oxygen gas is injected into the combustion chamber at high pressure thereby causing spontaneous combustion of the ambient air and homogeneous mixture of liquid diesel fuel and concentrated oxygen gas in the combustion chamber, thereby causing the piston to move downwardly.

In preferred aspects, the oxygen concentrator: (a) is a pressure swing adsorption-type (PSA-type) oxygen concentrator, (b) uses zeolites to absorb nitrogen from ambient air, or (c) uses membrane gas separation to separate and remove nitrogen from the ambient air. In preferred aspects, the concentrated oxygen gas has an oxygen concentration of greater than 50%, or more preferably greater than 90%.

When the engine is a vehicle engine, the diesel fuel is provided from an onboard diesel fuel tank, the oxygen concentrator is also onboard the vehicle and (when hydrogen gasses are added), the hydrogen source is also onboard the vehicle. Such hydrogen gas source may preferably include an onboard hydrogen tank, an onboard electrolysis system or an onboard reformer system.

In alternate preferred aspects, the present system provides a system for enhancing fuel combustion in an engine, comprising:

(a) a diesel fuel tank;

(b) an oxygen concentrator for providing concentrated oxygen gas;

(c) an infuser or mixer for mixing liquid diesel fuel from the diesel fuel tank together with the concentrated oxygen gas from the oxygen concentrator to form a homogeneous mixture of liquid diesel fuel and concentrated oxygen gas;

(d) an engine having a combustion chamber for receiving the homogeneous mixture of liquid diesel fuel and concentrated oxygen gas therein; and optionally, (e) a hydrogen gas supply, wherein the hydrogen gas is mixed together with the concentrated oxygen gas and the liquid diesel fuel in the infuser or mixer.

In further optional embodiments, other gasses besides oxygen and hydrogen may also be mixed into the liquid diesel fuel to the diesel fuel reaching the engine. Such mixing may occur in the infuser or mixer of the present system.

As stated above, the present system of adding gaseous oxygen to the liquid diesel fuel of a diesel engine will also work with both a standard diesel engine and a hydro-diesel engine. A hydro-diesel engine produces substantial engine combustion efficiency by mixing the diesel fuel with gaseous hydrogen. The source of hydrogen used in these hydro-diesel systems preferably includes a pressurized hydrogen gas tank, a water hydrolysis device or a reformer system. In the present system, the hydrogen gas is preferably atomizedly passed into the liquid diesel fuel and then the hydrogen gas and liquid diesel fuel are thoroughly mixed in an infuser or mixer to fully homogenize the hydrogen fuel mixture. In some preferred embodiments, additional gaseous and/or liquid additives can also be added to the diesel fuel. The hydrogen fuel mixture then proceeds through the diesel engine in manner similar to a standard conventional diesel engine. Including the gaseous hydrogen as an additive to the diesel fuel increases the mileage efficiency by upwards of 30% and therefore advantageously reduces noxious gases per mile by the same ratio simply because less fuel is being used. The present system preferably adds gaseous oxygen to the hydrogen-diesel fuel mixture either before, after or at the same time as the hydrogen is added. Adding the oxygen gas to the fuel mixture has contributed to even further improvement in mileage and thus reduction of noxious exhaust gases.

The system and method of the present invention uses an oxygen concentrator as the source of gaseous oxygen for use in a diesel engine and/or a hydro-diesel engine. Significantly, there are no references that suggest or teaches using an oxygen concentrator as a source of oxygen gas as a fuel additive. In the preferred aspects, the present oxygen concentrator uses as its input ordinary ambient air which has an oxygen concentration of around 22% and nitrogen of about 75%. In preferred aspects, the present oxygen concentrator removes upwards of 90% of the nitrogen which results in a concentrator output of about 95% oxygen. Such a 95% concentration of oxygen in the gas is more than sufficient for the oxygen additive from the concentrator to provide essentially the same engine efficiency as using a 100% oxygen source. A further benefit of the present system is that there is no need to carry a primary source for the oxygen (i.e.:

bottled oxygen or pure water for an electrolysis device). Instead, the input to the concentrator is open and freely available ambient air. This avoids the costs of having to continuously replenish the oxygen gas source during system operation.

Simply put, the present system provides improved operation of a diesel (or hydro-diesel) engine by adding gaseous oxygen into the liquid diesel fuel, wherein the oxygen in the gas is derived from an oxygen concentrator. The addition of such increased oxygen concentration gas enhances and more completely burns the diesel fuel within the combustion chamber of the diesel or hydro-diesel engine. The present system also optionally adds the oxygen gas to the diesel fuel together with other gaseous additives, including but not limited to hydrogen gas fuel to further improve combustion of the diesel fuel in a hydro-diesel engine, thereby resulting in improved fuel efficiency and decreased noxious exhaust gas emissions.

In alternate aspects, the present system provides a system and method of enhancing fuel combustion of a conventional diesel engine, by: (a) providing a supply of liquid diesel fuel; (b) providing an oxygen concentrator having an air input; (c) operating the oxygen concentrator to generate concentrated oxygen gas; (d) atomizedly bubbling the concentrated oxygen gas into the liquid diesel fuel; (e) mixing or infusing the concentrated oxygen gas with the liquid diesel fuel to generate a homogeneous mixture of fuel and oxygen; (f) passing the homogeneous mixture of fuel and oxygen into an injector pump; (g) passing air into a diesel engine combustion chamber via an air intake valve at a proper cycle of the engine and then compressing the air in the combustion chamber as a piston within the combustion chamber raises causing the air within the chamber to heat;

(h) injecting the homogeneous mixture of fuel and oxygen at high pressure into the combustion chamber; and then (i) permitting the homogeneous mixture of fuel and oxygen to spontaneously combust, thereby forcing the piston down and expelling the exhaust gases through an exhaust valve.

In another alternate aspects, the present system provides a system and method of enhancing fuel combustion of a hydro-diesel engine, by: (a) providing a supply of liquid diesel fuel; (b) providing a supply of gaseous hydrogen; (c) providing an oxygen concentrator having an air input; (d) operating the oxygen concentrator to generate concentrated oxygen gas; (e) separately or in combination atomizedly bubbling the hydrogen and the concentrated oxygen gas into the liquid diesel fuel; (f) mixing or infusing the hydrogen and concentrated oxygen gas with the liquid diesel fuel to generate a homogeneous mixture of fuel with oxygen and hydrogen gas; (g) passing the homogeneous mixture of fuel with oxygen and hydrogen gas into an injector pump; (h) passing air into a diesel engine combustion chamber via an air intake valve at a proper cycle of the engine and then compressing the air in the combustion chamber as a piston within the combustion chamber raises causing the air within the chamber to heat; (i) injecting the homogeneous mixture of fuel with oxygen and hydrogen gas at high pressure into the combustion chamber; and then (i) permitting the homogeneous mixture of fuel with oxygen and hydrogen gas to spontaneously combust, thereby forcing the piston down and expelling the exhaust gases through an exhaust valve.

As described herein, the present system uses an oxygen concentrator to supply an increased concentration of oxygen into the hydrogen diesel fuel mixture. The present choice of an oxygen concentrator yields many unexpected benefits including increasing combustion efficiency and reducing noxious gas exhaust per mile or time of operation; providing substantially the same benefit as provided by a 100% oxygen concentration; eliminating the need for an additional oxygen source material, and eliminating the need the need to replenish the oxygen source materials. These benefits are non-obvious to someone skilled in the art as not being suggested or taught by the prior art.

DETAILED DESCRIPTION OF THE DRAWINGS

Figure 1:
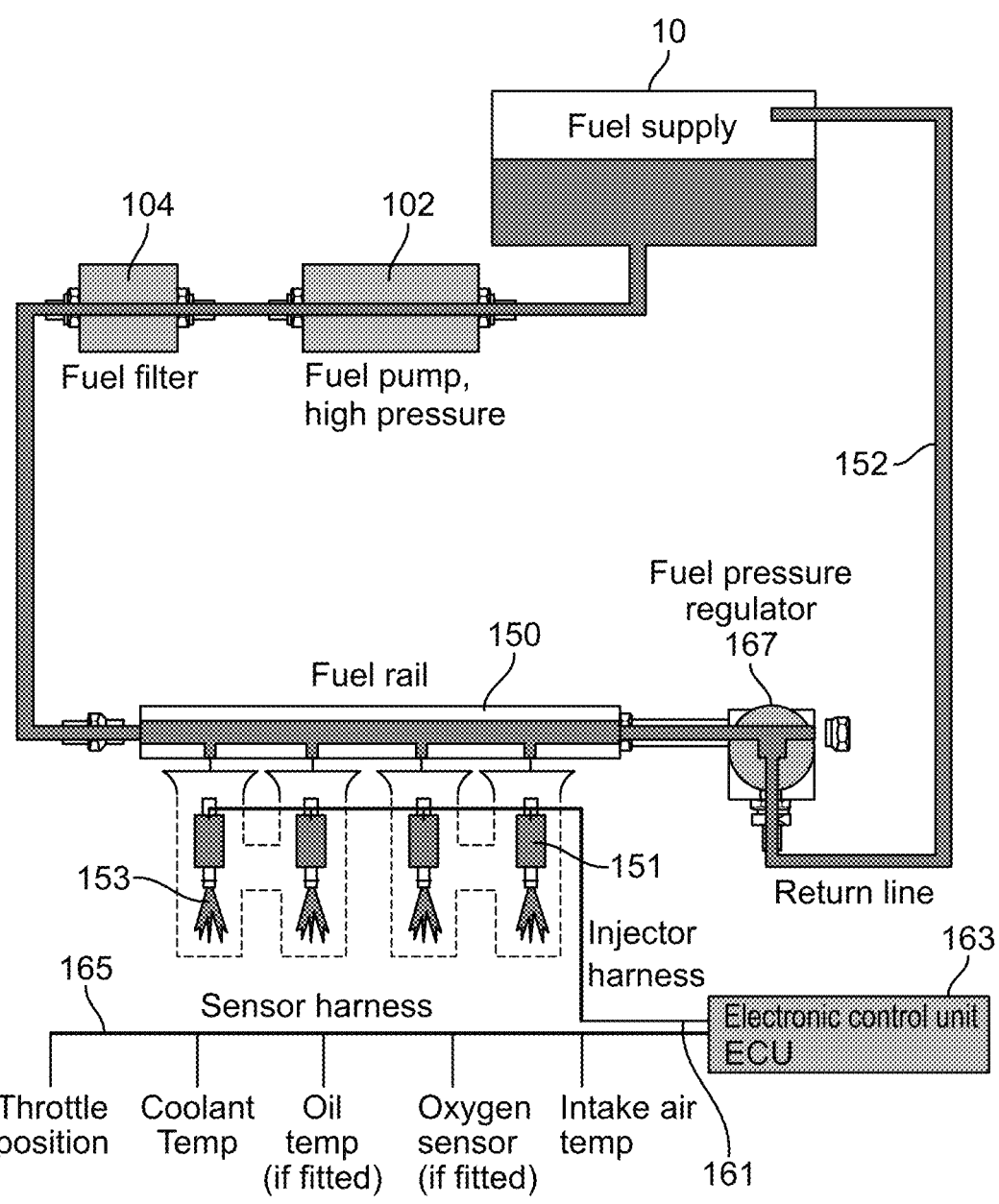
FIG. 1 shows a conventional diesel engine.

FIG. 1 shows a conventional diesel engine having a fuel supply 10, a high pressure fuel pump 102, and an optional fuel filter 104. The fuel is passed to the fuel rail 150 at high pressure. The fuel is passed from the fuel rail 150 through the injectors 151 into the combustion chamber 153. The injectors 151 are controlled via the injector harness 161 from an injector controller 163. FIG. 1 also shows engine sensor harness 165 that monitors engine parameters permits the controller to signal the injectors. In addition, FIG. 1 shows fuel pressure regulator 167 that controls the feedback return line 152 through which unused fuel is returned to the fuel supply 100.

Figure 2:
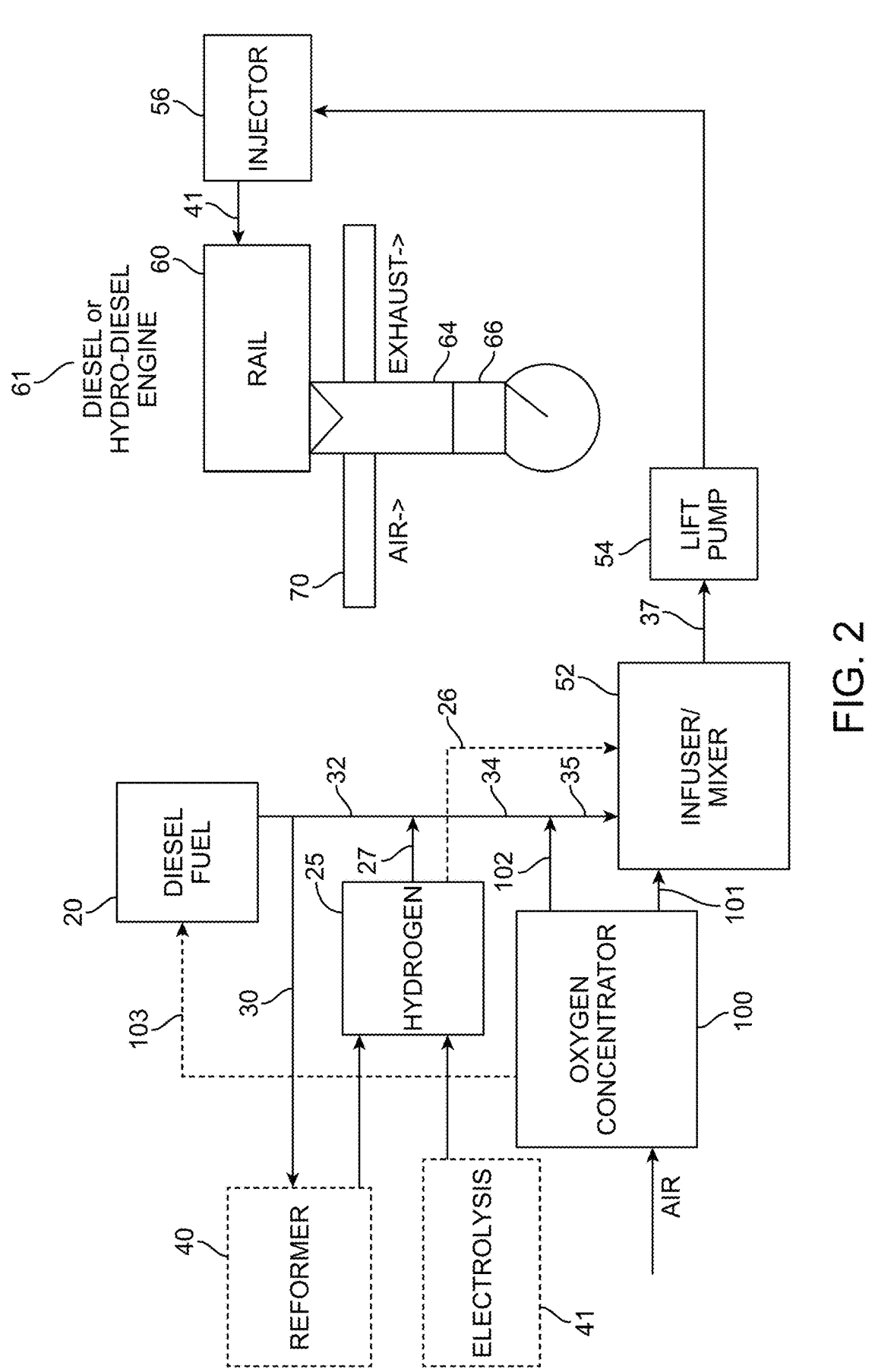
FIG. 2 shows a schematic of the present system using an oxygen concentrator as the oxygen source to supply concentrated oxygen gas for mixing into liquid diesel fuel (for use in a standard diesel engine or a hydro-diesel engine).

FIG. 2 shows the present system for enhancing the efficiency of diesel or hydro-diesel engine combustion, and for reducing air pollution, as follows.

The present system provides a method of enhancing fuel combustion in an engine, by providing a supply of liquid diesel fuel 20 (which preferably comprises a diesel fuel tank) and an oxygen concentrator 100 which receives air therein and removes nitrogen from the air to produce a concentrated oxygen gas. In preferred aspects, the concentrated oxygen gas from oxygen concentrator 100 is mixed into the liquid diesel fuel from supply 20 in infuser/mixer 52 to form a homogeneous mixture of liquid diesel fuel and concentrated oxygen gas. A lift pump 54 can be used to pump the homogeneous mixture of liquid diesel fuel and concentrated oxygen gas into an injector 56 which then sends the mixture through a common rail 60 and into the engine's combustion chamber 64.

In preferred aspects, the mixing of the concentrated oxygen gas (provided by oxygen concentrator 100) into the liquid diesel fuel (provided from source 20) may occur both within infuser/mixer 52, prior to entry into infuser/mixer 52, or both. For example, concentrated oxygen gas can be passed in path 101 to enter infuser/mixer 52 while liquid diesel fuel in path 35 also enters infuser/mixer 52. Alternately, rather than using separate paths for the liquid diesel fuel and concentrated oxygen gas to enter the infuser/mixer 52, the concentrated oxygen gas can instead be passed in path 102 to premix with the liquid diesel fuel coming from path 34 slightly upstream of infuser/mixer 52. It is to be understood that both options are considered within the scope of the present system. Specifically, the concentrated oxygen gas can be mixed with the liquid diesel fuel upstream of the infuser/mixer 52, within the infuser/mixer 52 or both.

In further optional embodiments a portion of the concentrated oxygen gas produced by oxygen concentrator 100 can even be sent in path 103 into diesel fuel tank 20. As such, storing some of the concentrated oxygen gas produced by oxygen concentrator 100 within the diesel fuel tank or source 20 can permit chemical mixing of the concentrated oxygen gas into liquid diesel fuel even prior to the present system even being turned on.

It is also to be understood that the present infuser/mixer 52 may comprise any suitable infusion or mixing system known to persons skilled in the art. Examples of suitable infusers and mixing systems can also be found in Applicant's co-pending Patent Application PCT/US23/35695, entitled METHOD AND DEVICES COMBINING DIESEL FUEL AND HYDROGEN GAS TO FORM A HOMOGENIZED LIQUID HYDRO-DIESEL FUEL, filed Oct. 23, 2023, the entire disclosure of which is incorporated herein by reference in its entirety for all purposes.

The present system need not be limited to use in a standard, conventional diesel engine. Rather, the present system may also be used in a hydro-diesel engine, as follows. In a hydro-diesel engine, hydrogen gas (from optional hydrogen source 25) is mixed into the liquid diesel fuel. Similar to how the concentrated oxygen gas was mixed into the liquid diesel fuel as described above, the hydrogen gas from source 25 can also be mixed into the liquid diesel fuel in the same manner. For example, hydrogen gas from source 25 can be sent through path 26 to enter infuser/mixer 52 while liquid diesel fuel in path 35 also enters infuser/mixer 52. Alternately, rather than using separate paths for the liquid diesel fuel and hydrogen gas to enter the infuser/mixer 52, the hydrogen gas can instead be sent in path 27 to premix with the liquid diesel fuel coming from path 34, thus meeting slightly upstream of infuser/mixer 52. It is to be understood that both options are considered within the scope of the present system. Specifically, the hydrogen gas can be mixed with the liquid diesel fuel upstream of the infuser/mixer 52, within the infuser/mixer 52 or both. Specifically, the diesel fuel, concentrated oxygen gas and optional hydrogen gas can be mixed in any order or all at once all keeping within the scope of the present invention.

In optional aspects, the hydrogen $H_2$ in tank 25 is simply supplied by bottled hydrogen in a tank. In other optional aspects, however, the hydrogen in tank 25 can be supplied into tank 25 using other systems such as an electrolysis system 41 (shown in dotted lines) or a reformer 40 (also shown in dotted lines). Examples of suitable reformers 40 are found in Applicant's co-pending Patent Application PCT/US2023/037208, entitled System and Method for Producing Hydrogen Gas from Diesel Fuel Using a Reformer or Other Hydrogen Gas Production System and for Mixing the Hydrogen Gas Back into the Liquid Diesel Fuel Prior to Sending the Liquid Diesel Fuel into a Hydro-Diesel Engine, filed Nov. 13, 2023, the entire disclosure of which is incorporated herein by reference in its entirety for all purposes.

Thus, in various aspects of the present system, mixing the hydrogen gas into the liquid diesel fuel forms a homogeneous mixture of liquid diesel fuel, concentrated oxygen gas and hydrogen gas. The hydrogen gas and the oxygen gas are preferably added to the diesel fuel by atomizing injection into the fuel to generate small gaseous bubbles. In preferred aspects, the concentrated oxygen gas (and optional hydrogen gas) is bubbled into the liquid diesel fuel.

In accordance with the present system, passing the homogeneous mixture of liquid diesel fuel and concentrated oxygen gas into the combustion chamber of an engine comprises:

providing a lift pump 54 and an injector 56;

using the lift pump 54 to pump the homogeneous mixture of liquid diesel fuel and concentrated oxygen gas from the infuser or mixer 52 into the injector 56; and then using the injector 56 to inject the homogeneous mixture of liquid diesel fuel and concentrated oxygen gas into:

(i) the combustion chamber 66 of the engine 61, or (ii) a common rail 60 leading into the combustion chamber 66 of the engine 61.

In addition, the present system preferably comprises:

passing ambient air into combustion chamber 64 through an air inlet valve or path 70 on the engine;

compressing the ambient air in combustion chamber 64 with a piston 66 moving upwardly thereby increasing the temperature of the ambient air; while injecting the homogeneous mixture of liquid diesel fuel and concentrated oxygen gas into the combustion chamber 64 at high pressure thereby causing spontaneous combustion of the ambient air and homogeneous mixture of liquid diesel fuel and concentrated oxygen gas in combustion chamber 64, thereby causing piston 66 to move downwardly.

In preferred aspects, the oxygen concentrator 100: (a) is a pressure swing adsorption-type (PSA-type) oxygen concentrator, (b) uses zeolites to absorb nitrogen from ambient air, or (c) uses membrane gas separation to separate and remove nitrogen from the ambient air. Preferably, the concentrated oxygen gas has an oxygen concentration of greater than 50%, and most preferably greater than 90%.

Preferably, engine 61 is vehicle engine (for example, a car, bus, train, locomotive, or other transportation system engine) and liquid diesel source 20, and oxygen concentrator 100 (and optional hydrogen source 25) are all stored onboard the vehicle.

In preferred aspects, the present system provides a system for enhancing fuel combustion in an engine 61, comprising:

(a) a diesel fuel tank 20;

(b) an oxygen concentrator 100 for providing concentrated oxygen gas;

(c) an infuser or mixer 52 for mixing liquid diesel fuel from the diesel fuel tank together with the concentrated oxygen gas from the oxygen concentrator to form a homogeneous mixture of liquid diesel fuel and concentrated oxygen gas; and (d) an engine 61 having a combustion chamber 64 for receiving the homogeneous mixture of liquid diesel fuel and concentrated oxygen gas therein.

Optionally included as well (i.e.: in the case of hydro-diesel engines) is: (e) a hydrogen gas supply 25, wherein the hydrogen gas from supply 25 is mixed together with the concentrated oxygen gas and the liquid diesel fuel in the infuser or mixer. This hydrogen gas supply may be bottled hydrogen, electrolysis sourced hydrogen (from an optional electrolysis system 41) or reformed hydrogen (from an optional reformer 40). If an optional diesel fuel reformer 40 is used, diesel fuel leaves tank 20, a first portion is sent in path 30 into reformer 40 (which will extract hydrogen from the diesel fuel) while a second portion is sent in path 32 and simply bypasses the reformer. If an alternative electrolysis system 41 is used instead (or in addition to systems described herein), hydrogen gas is generated by electrically splitting water molecules into its components of hydrogen and oxygen. The generated hydrogen gas from systems 40 or 41 can be collected in hydrogen tank 25. Pursuant to either method of generating hydrogen, the hydrogen can be combined with the diesel fuel to form a hydrogen-fuel combination that is sent into the infuser/mixer 52.

In any of the above cases, and in accordance with the present system, the mixing of hydrogen gas into the liquid diesel fuel to form a homogeneous gas/fuel mixture at 34 is carried out by bubble injecting the hydrogen gas into the liquid diesel within the infuser/mixer 52. The oxygen-hydrogen-fuel mixture can be thoroughly mixed within infuser/mixer 52 the combination to form a homogenous mixture of oxygen and hydrogen gas bubbles in liquid diesel fuel, leaving the infuser/mixer 52 at path 37. Next, the mixture is pressurized to thereby compress the hydrogen gas bubbles distributed throughout the diesel fuel by lift pump 54 which reduces the size of the hydrogen bubbles in the homogenous mixture of oxygen and hydrogen gas in the diesel fuel mixture.

The homogenized mixture of hydrogen gas and diesel fuel and oxygen is then passed to common rail 60 by injection pump 56 through path 41. Next, the high pressure homogenized hydrogen/fuel mixture is then injected into combustion chamber 64 in engine 61. Ambient air is drawn into the combustion chamber 64 through valve or path 70 on the piston's 66 inwardly movement. From the common rail 60, the high pressure homogenized oxygen-hydrogen-fuel mixture is atomizedly injected into the combustion chamber 64 as the piston 66 reaches top dead center. The piston 66, on its outward movement, compresses the air within combustion chamber 64 resulting in heated air having a sufficiently high temperature to spontaneously combust the gas-fuel mixture when injected therein.

The high pressure homogenized mixture of hydrogen gas and diesel fuel and oxygen in the common rail 60 is atomizedly injected into the combustion chamber 64, when the piston 66 is at a position about top dead center. The combustion chamber 64 at this point is at a much lower pressure than the injected gas-fuel mixture, permitting the minute hydrogen and oxygen bubbles in the homogenized gas-fuel mixture to immediately and violently expand and increase in size causing great agitation and forcing the immediate disruption and distribution of the diesel fuel into minute droplets throughout the combustion chamber 64. The outward movement of piston 66 compresses the air within the combustion chamber, resulting in heated air sufficient high to cause the spontaneously and violent combustion of the fuel.

Oxygen Concentrators come in different configurations, and the present system is not limited to any one form of oxygen concentrator 100. Oxygen concentrators have been used to provide oxygen rich air for patients with various medical conditions.

One example of an oxygen concentrator that is suitable with the present system is seen in U.S. Pat. No. 8,377,180. This patent reference is incorporated herein by reference. This oxygen concentrator is a pressure swing adsorption-type (PSA-type) oxygen concentrator, which produces a highly concentrated oxygen gas by introducing compressed air from a compressor into an adsorption cylinder filled with an adsorbent such as zeolites and the like selectively adsorbing a nitrogen gas to eliminate selectively a nitrogen gas in the air. First, compressed air is supplied by a compressor into an adsorption cylinder to adsorb a nitrogen gas contained in air by an adsorbent such as zeolites and the like. The oxygen concentration in air is increased by selective adsorption and elimination of a nitrogen gas. A small amount of concentrated oxygen gas may also be supplied into the adsorption cylinder to promote the desorption of nitrogen. Thus, highly concentrated oxygen-enriched air having an oxygen concentration as high as 95% may be obtained from air by repeatedly pressurizing and depressurizing the adsorption cylinder using the PSA-type oxygen concentrator.

Other examples of oxygen concentrators that are suitable with the present system use zeolites to absorb nitrogen. Examples of such systems are found in U.S. Pat. Nos. 11,247,014; 9,884,162 and 6,478,857. These references are incorporated herein by reference in their entireties as well.

Other examples of oxygen concentrators that are suitable with the present system include oxygen concentrators that use membrane gas separation to separate (and remove) the nitrogen in the atmosphere, thereby increasing the percentage of oxygen in the air coming out of the concentrator. It is to be understood that the present system encompasses any and all configurations and systems of oxygen concentrators without limitation.

The pressurized fuel and oxygen mixture in the common rail 60 is preferably atomized into small droplets when injected into the combustion chamber 64. Each droplet is imbedded with tiny compressed bubbles of oxygen. As these minute fuel and gas mixture droplets experience the decreased pressure inside of the combustion chamber the bubbles immediately experience a rapid volumetric expansion further particulating the fuel droplets, increasing the diesel fuel surface area thereby permitting the more complete combustion of the fuel. The oxygen/hydrogen fuel mixture will also experience the same rapid volumetric expansion when injected into the combustion chamber 64. The droplets of fuel and expanding gas bubbles force a rapid expansion throughout the combustion chamber where the pressure and the heat the tiny droplets of diesel fuel together with the air including its O2 components received from the air intake contribute to a more through and complete combustion.

A further consequence of injecting the oxygen/hydrogen fuel mixture into the combustion chamber 64 as part of the fuel mixture results an earlier combustion due to the lower flash point of hydrogen relative to diesel fuel. The lower hydrogen flash point causes the hydrogen to combust earlier which contributes to an earlier increase in heat causing he diesel fuel to ignite earlier and more completely. In addition and because the diesel fuel has experience additional particulation with greater surface area, the diesel fuel experiences a more complete combustion and increase in energy release, thereby increasing the combustion efficiency.

In addition, the hydrogen within the oxygen/hydrogen fuel mixture is being infused and adsorbed into the structure of the hydrocarbons that are carried directly into the combustion chamber as compressed gaseous molecules or ionic hydrogen atoms with the injected fuel. It therefore does not carry the major shortcoming of air-intake induction of hydrogen into the combustion chamber, which effectively displaces (at stoichiometric conditions) combustion chamber air content (and the benefits of the oxygen).

As such, the hydrogen added during the infusion process is not merely mixed or blended. Through a sequence of chemical processes, the H ions chemically repack and are adsorbed into the molecular structure of the hydrocarbons forming a more combustible long chain hydrocarbon. At the heart of the hydrodiesel infusion system is the differential chemical reaction between the injected molecular hydrogen and the bonded hydrogen atoms of the various fractions of diesel fuel. The reaction appears to consist of several components: (a) the selective hydrogenolysis, or bond dissociation, of unsaturated double-bond aromatics, liberating an additional volume (approximately 2×) of hydrogen [fractional changes]: (b) the selective hydrogenation, or adsorption, of injected and liberated hydrogen atoms onto accessible carbon atoms in the single-bond long chain saturated isoparaffinics [molar changes]; and (c) the retention of a volume of liberated ionic hydrogen and injected hydrogen molecules in highly pressurized gaseous form, and thus immediately available in that form at the moment of flame propagation [combustion changes]. Therefore the hydrogen reaction process is another source of the observed fuel efficiency is a product of a significantly enhanced fuel combustion sequence.

In the present system, the diesel fuel and oxygen mixture was atomized into small droplets as it was injected into the combustion chamber. In preferred aspects, each droplet was also imbedded with tiny compressed bubbles of hydrogen. As these fuel gas mixture droplets experience the decreased pressure of the inside of the combustion chamber the hydrogen bubbles immediately experience a rapid volumetric expansion further particulating the fuel, increasing the diesel fuel surface area and thereby permitting the more complete combustion of the fuel. In addition, the hydrogen that is injected into the combustion chamber 64 is released from the fuel gas mixture, expands throughout the combustion chamber and reacts with the O2 from the air via the air intake further contributing to the combustion.

Two principal sources of improved combustion efficiency can include: (a) the induced turbulence, spray, and distributional effects, and (b) the enhanced combustion physics, as follows.

(a) Enhanced Turbulence: The physics of sudden gaseous expansion of gaseous bubbles is a novel variable in the combustion equation, directly affecting the event in several ways. First, the kinetic gas expansion physically propels bubbles independently, thereby altering the spray configuration and, just prior to ignition, magnifying and compounding the normal, and desirable, boundary turbulence and distribution critical to complete fuel consumption, fuel efficiency, and minimization of unburnt exhaust emissions. At a minimum, the gaseous kinetics function to induce added expansive precombustion turbulence, ensuring a significant increase in surface area and, hence, high propagation speed and a sharp increase in cylinder pressure. The gaseous bubbles are also not burning in the same manner, or at the same time, or at the same place as the bonded gaseous bubbles. Their action, however, is directly affecting the expansion and stratification characteristics of flame propagation, increasing the surface area of the flame, the burn velocity, and the penetration of the burn throughout the chamber. The burn efficiency of the combustion event improves at each phase, from ignition initiation through bloom and decay. In sum, the gaseous bubbles, undergoing explosive expansion at a microscopic scale, combined with liberated ionic H atoms, are effecting a far more powerful, distributed, uniform, and enduring combustion event.

(b) Combustion Effects: The high inertial, heavy mass, diesel hydrocarbon molecule will naturally concentrate near the center of the injection spray, while the large, light weight, rapidly expanding, and suddenly slowing and mixing hydrogen gas molecule (and ionic H atoms) will migrate to the periphery of the spray. Given that the principal chemical transformation of combustion takes place along the thin jet interfacial (boundary) region separating the unburned and the burned gases, this sequence, in theory, places the hydrogen gas at the ideal place at the ideal moment of combustion. It is important to note that the free (not adsorbed) ionic hydrogen produced during the infusion process is more reactive than molecular hydrogen, further accelerating the combustion physics.

What is claimed is:

1. A method of enhancing fuel combustion in an engine, comprising:

(a) providing a supply of liquid diesel fuel;

(b) providing an oxygen concentrator, wherein the oxygen concentrator receives air therein and removes nitrogen from the air to produce a concentrated oxygen gas;

(c) providing a first flow path for physically mixing the concentrated oxygen gas into the liquid diesel fuel in an infuser or mixer to form a homogeneous mixture of liquid diesel fuel and concentrated oxygen gas;

(d) providing a second flow path for chemically mixing the concentrated oxygen into the liquid diesel fuel upstream of the infuser or mixer; and then (e) passing the homogeneous mixture of liquid diesel fuel and concentrated oxygen gas from the infuser or mixer into a combustion chamber of the engine.

2. The method of claim 1, wherein the engine is a diesel engine.

3. The method of claim 1, wherein the engine is a hydro-diesel engine, further comprising:

(f) providing a supply of hydrogen gas; and (g) mixing the hydrogen gas into the liquid diesel fuel to form a homogeneous mixture of liquid diesel fuel, concentrated oxygen gas and hydrogen gas.

4. The method of claim 3, wherein the hydrogen gas, concentrated oxygen gas and diesel fuel are mixed together in the infuser or mixer.

5. The method of claim 3, wherein the hydrogen gas is provided through bottled hydrogen, electrolysis sourced hydrogen or reformed hydrogen.

6. The method of claim 1, wherein the concentrated oxygen gas is bubbled into the liquid diesel fuel.

7. The method of claim 1, wherein passing the homogeneous mixture of liquid diesel fuel and concentrated oxygen gas into the combustion chamber of an engine comprises:

providing a lift pump and an injector;

using the lift pump to pump the homogeneous mixture of liquid diesel fuel and concentrated oxygen gas from the infuser or mixer into the injector; and then using the injector to inject the homogeneous mixture of liquid diesel fuel and concentrated oxygen gas into:

(i) the combustion chamber of the engine, or (ii) a common rail leading into the combustion chamber of the engine.

8. The method of claim 1, further comprising:

passing ambient air into the combustion chamber through an air inlet valve on the engine;

compressing the ambient air in the combustion chamber with a piston moving upwardly thereby increasing the temperature of the ambient air; while injecting the homogeneous mixture of liquid diesel fuel and concentrated oxygen gas into the combustion chamber at high pressure thereby causing spontaneous combustion of the ambient air and homogeneous mixture of liquid diesel fuel and concentrated oxygen gas in the combustion chamber, thereby causing the piston to move downwardly.

9. The method of claim 1, wherein the concentrated oxygen gas has an oxygen concentration of greater than 50%.

10. The method of claim 9, wherein the concentrated oxygen gas has an oxygen concentration of greater than 90%.

11. The method of claim 1, wherein the oxygen concentrator:

is a pressure swing adsorption-type (PSA-type) oxygen concentrator, uses zeolites to absorb nitrogen from ambient air, or uses membrane gas separation to separate and remove nitrogen from the ambient air.

12. The method of claim 1, wherein the engine is vehicle engine, and wherein the supply of liquid diesel fuel is a tank of liquid diesel fuel onboard the vehicle, and wherein the oxygen concentrator is onboard the vehicle.

13. The method of claim 12, wherein the vehicle is an automobile, bus or locomotive.

14. A system for enhancing fuel combustion in an engine, comprising:

(a) a diesel fuel tank;

(b) an oxygen concentrator for providing concentrated oxygen gas;

(c) an infuser or mixer for mixing liquid diesel fuel from the diesel fuel tank together with the concentrated oxygen gas from the oxygen concentrator to form a homogeneous mixture of liquid diesel fuel and concentrated oxygen gas;

(d) a first flow path for physically mixing the concentrated oxygen gas into the liquid diesel fuel in the infuser or mixer;

(e) a second flow path for chemically mixing the concentrated oxygen into the liquid diesel fuel upstream of the infuser or mixer; and (f) the engine having a combustion chamber for receiving the homogeneous mixture of liquid diesel fuel and concentrated oxygen gas therein.

15. The system of claim 14, wherein the engine is a vehicle engine, and wherein both the diesel fuel tank and the oxygen concentrator are onboard the vehicle.

16. The system of claim 14, further comprising:

(g) a hydrogen gas supply, wherein the hydrogen gas is mixed together with the concentrated oxygen gas and the liquid diesel fuel in the infuser or mixer.

17. The system of claim 16, wherein the hydrogen gas supply is bottled hydrogen, electrolysis sourced hydrogen or reformed hydrogen.

18. The system of claim 14, wherein the oxygen concentrator:

is a pressure swing adsorption-type (PSA-type) oxygen concentrator, uses zeolites to absorb nitrogen from ambient air, or uses membrane gas separation to separate and remove nitrogen from the ambient air.

19. The system of claim 14, further comprising:

(e) a lift pump; and (f) an injector, wherein the lift pump pumps the homogeneous mixture of liquid diesel fuel and concentrated oxygen gas from the infuser or mixer into the injector; and wherein the injector injects the homogeneous mixture of liquid diesel fuel and concentrated oxygen gas into:

(i) the combustion chamber of the engine, or (ii) a common rail leading into the combustion chamber of the engine.

20. The method of claim 1, wherein the second flow path for chemically mixing the concentrated oxygen into the liquid diesel fuel upstream of the infuser or mixer comprises premixing the concentrated oxygen and liquid diesel fuel immediately upstream of the infuser or mixer.

21. The method of claim 12, wherein the second flow path for chemically mixing the concentrated oxygen into the liquid diesel fuel upstream of the infuser or mixer comprises sending the concentrated oxygen into the tank of liquid diesel fuel.

22. The system of claim 14, wherein the second flow path for chemically mixing the concentrated oxygen into the liquid diesel fuel upstream of the infuser or mixer comprises premixing the concentrated oxygen and liquid diesel fuel immediately upstream of the infuser or mixer.

23. The system of claim 14, wherein the second flow path for chemically mixing the concentrated oxygen into the liquid diesel fuel upstream of the infuser or mixer comprises sending the concentrated oxygen into the diesel fuel tank.

* * * * *